US010616850B2

(12) United States Patent
Chen et al.

(10) Patent No.: US 10,616,850 B2
(45) Date of Patent: Apr. 7, 2020

(54) PERIODIC TIMER SYNCHRONIZATION LOGIC FOR RRC INACTIVE STATE (71) Applicant: Telefonaktiebolaget LM Ericsson (publ), Stockholm (SE)

(72) Inventors: Qian Chen, Mölndal (SE); Josefin Karlsson, Torslanda (SE); Peter Ramle, Mölnlycke (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/030,540

(22) Filed: Jul. 9, 2018

(65) Prior Publication Data

US 2018/0317194 A1 Nov. 1, 2018

Related U.S. Application Data (63) Continuation of application No. PCT/EP2017/084302, filed on Dec. 22, 2017.

(60) Provisional application No. 62/476,016, filed on Mar. 24, 2017.

(51) Int. Cl.
*H04W 60/04* (2009.01)
*H04W 64/00* (2009.01)
*H04W 8/08* (2009.01)
*H04W 76/27* (2018.01)

(52) U.S. Cl.
CPC .............. *H04W 60/04* (2013.01); *H04W 8/08* (2013.01); *H04W 64/00* (2013.01); *H04W 76/27* (2018.02)

(58) Field of Classification Search
CPC ..... H04W 60/02; H04W 76/20; H04W 76/27; H04W 76/32–38; H04W 8/08; H04W 64/00
See application file for complete search history.

(56) References Cited

U.S. PATENT DOCUMENTS 8,527,018 B2 * 9/2013 Kim .................. H04W 52/0229
455/458
2011/0195714 A1 * 8/2011 Sawinathan ........ H04W 60/005
455/435.1

(Continued)

OTHER PUBLICATIONS

International Search Report and Written Opinion issued in International Application No. PCT/EP2017/084302, dated Mar. 22, 2018, 17 pages.

(Continued)

*Primary Examiner* — Allahyar Kasraian
(74) *Attorney, Agent, or Firm* — Rothwell, Figg, Ernst & Manbeck, P.C.

(57) ABSTRACT

A method performed by an AMF is provided. The method includes determining an elapsed time value ($\delta_{RAN}$). The method further includes determining whether the elapsed time value is less than a negotiated NAS periodic timer ($\tau_{NAS\text{-}per}$). The AMF is configured such that, as a result of the AMF determining that $\delta_{RAN} < \tau_{NAS\text{-}per}$, the AMF transitions the UE to CM-IDLE state and starts a NAS periodic timer with a value equal to $\tau_{NAS\text{-}per} - \delta_{RAN}$.

9 Claims, 11 Drawing Sheets

(56) References Cited

U.S. PATENT DOCUMENTS

| | | | | |
|---|---|---|---|---|
| 2012/0208486 A1* | 8/2012 | Liao | ............ | H04W 28/02 |
| | | | | 455/404.1 |
| 2013/0308527 A1* | 11/2013 | Chin | ............ | H04W 36/0022 |
| | | | | 370/328 |
| 2016/0219503 A1* | 7/2016 | Kim | ............ | H04W 8/065 |
| 2017/0150466 A1* | 5/2017 | Sunell | ............ | H04W 4/70 |
| 2017/0230817 A1* | 8/2017 | Ryu | ............ | H04W 28/02 |
| 2018/0227872 A1* | 8/2018 | Li | ............ | H04W 76/20 |
| 2018/0242193 A1* | 8/2018 | Teyeb | ............ | H04W 76/20 |
| 2018/0270791 A1* | 9/2018 | Park | ............ | H04W 68/04 |
| 2019/0014512 A1* | 1/2019 | Rune | ............ | H04W 36/0016 |
| 2019/0021064 A1* | 1/2019 | Ryu | ............ | H04W 68/005 |

OTHER PUBLICATIONS

3GPP TS 23501 V0.3.1, 3rd Generation Partnership Project; Technical Specification Group Services and System Aspects; System Architecture for the 5G System; Stage 2 (Release 15), Mar. 2017, 97 pages Ericsson, "Introduction of the RRC Inactive state to 5G system architecture", 3GPP Draft, 3GPP TSG-SA2 Meeting #120, S2-171903, Busan, Korea, Mar. 2017, 5 pages.

3GPP TR 23.799 V14.0.0, 3rd Generation Partnership Project; Technical Specification Group Services and System Aspects; Study on Architecture for Next Generation System (Release 14), Dec. 2016, 522 pages.

3GPP TS 23502 V0.2.0, 3rd Generation Partnership Project;Technical Specification Group Services and System Aspects; Procedures for the 5G System; Stage 2 (Release 15) Feb. 2017, 71 pages.

3GPP TS 23502 V0.3.0, 3rd Generation Partnership Project;Technical Specification Group Services and System Aspects; Procedures for the 5G System; Stage 2 (Release 15) Mar. 2017, 115 pages.

Ericsson, "Introduction of the RRC Inactive state to 5G system architecture", 3GPP TSG-SA2 Meeting #121, S2-174076, Hangzhou, China, May 2017, 5 pages.

Ericsson, "Introduction of the RRC Inactive state to 5G system architecture", 3GPP TSG-SA2 Meeting #121, S2-173326, Hangzhou, China, May 2017, 5 pages.

* cited by examiner

FIG. 11

PERIODIC TIMER SYNCHRONIZATION LOGIC FOR RRC INACTIVE STATE

CROSS-REFERENCE TO RELATED APPLICATIONS

This application is a continuation of International Patent Application No. PCT/EP2017/084302, filed on Dec. 22, 2017, which claims the benefit of U.S. Provisional Application No. 62/476,016, filed on Mar. 24, 2017. The above identified applications are incorporated by this reference.

TECHNICAL FIELD

Disclosed are embodiments related to handling user equipment (UE) reachability by access network (AN) and Core Network (CN).

BACKGROUND

The concept of user equipment (UE) reachability is described in 3GPP TS 23.501 v0.3.0 clauses 5.40.1 (CM-IDLE) and 5.4.2 (CM-CONNECTED). In short, reachability management is responsible for detecting whether the UE is reachable and providing UE location (i.e., access node) for the network to reach the UE. This is done by paging UE and UE location tracking. The UE location tracking includes both UE registration area tracking (i.e., UE registration area update) and UE reachability tracking (i.e., UE periodic registration area update). Such functionalities can be either located at 5GC (in case of CM-IDLE state) or 5G-RAN (in case of CM-CONNECTED state).

SUMMARY

As indicated in the referenced 3GPP TS 23.501 v0.3.0, several areas are marked for further study (indicated as "FFS"). One such area is how the periodic timer at the Radio Resource Control (RRC) level and the periodic timer at the Non-Access-Stratum (NAS) protocol level can work together. If this issue is not addressed, then the total time that the UE stays in a "reachable" state (i.e., either at RRC inactive state and RAN is responsible for UE reachability, or at CM-IDLE state and CN is responsible for UE reachability) is incorrect. If too long, the UE is wrongly considered reachable by the network; if too short, the UE is wrongly considered not reachable by the network.

This disclosure describes a coordination between the access network (e.g., 5G RAN) and core network (e.g., 5G Core (e.g., AMF)) to coordinate time spent by the RAN in the RRC inactive state with respect to a particular UE so the core network can start a proper NAS level timer when the UE changes state from "CM-CONNECTED" and "RRC inactive" to the "CM-IDLE" state. This coordination improves overall management, and particularly, the management of the total time for the UE to stay "reachable."

In one aspect there is provided a method performed by an AMF. In some embodiments, the method includes: the AMF determining an elapsed time value ($\delta_{RAN}$); and the AMF determining whether the elapsed time value is less than a negotiated NAS periodic timer ($\tau_{NAS-per}$), wherein the AMF is configured such that, as a result of the AMF determining that $\delta_{RAN} < \tau_{NAS-per}$, the AMF transitions the UE to CM-IDLE state and starts a NAS periodic timer with a value equal to $\tau_{NAS-per} - \delta_{RAN}$.

In some embodiments, the AMF is further configured such that as a result of the AMF determining that $\tau_{NAS-per} \leq \delta_{RAN}$, the AMF transitions the UE to CM-IDLE state and clears a Paging Proceed Flag (PPF) associated with the UE.

In some embodiments, the AMF is further configured such that as a result of the AMF determining that $\tau_{NAS-per} \leq \delta_{RAN}$ and $\delta_{RAN} < \tau_{NAS-per} + \tau_{det}$, the AMF starts a NAS periodic timer at a value equal to $\tau_{det} - (\delta_{RAN} - \tau_{NAS-per})$, wherein $\tau_{det}$ is a NAS implicit detach timer.

In some embodiments, the AMF is further configured such that as a result of the AMF determining that $\delta_{RAN} > \tau_{NAS-per} + \tau_{det}$, the AMF implicitly detaches the UE.

In some embodiments, determining the elapsed time value comprises receiving from an access network (AN) a user equipment (UE) context release request including an elapsed time value.

In another embodiment, the AMF performs a method that includes: determining that a user equipment (UE) is ready to transition to a CM-CONNECTED, RRC-Active state; and in response to determining that the UE is ready to transition to a CM-CONNECTED, RRC-Active state, sending to an access network (AN) a UE context request including a NAS periodic timer and a NAS registration area.

In another embodiment, the AMF performs a method that includes: receiving from an access network (AN) a N2 UE context release request associated with a UE and including an elapsed time value indicating the amount of time that elapsed between the AN starting a periodic timer for use in monitoring the UE and the AN transmitting the N2 UE context release request. In some embodiments, the method also includes: determining that a user equipment (UE) is ready to transition to a CM-CONNECTED, RRC-Active state; and in response to determining that the UE is ready to transition to a CM-CONNECTED, RRC-Active state, sending to an access network (AN) a UE context request including a NAS periodic timer and a NAS registration area.

In another aspect a method performed by an access network (AN) is provided. In some embodiments, the method includes: the AN receiving from an AMF a user equipment (UE) context request including a NAS periodic timer and a NAS registration area, indicating that a UE is ready to transition to a CM-CONNECTED, RRC-Active state; and the AN setting up an RRC connection between the UE and the AN.

In another embodiment the AN performs a method that includes: determining that a user equipment (UE) has transitioned to CM-CONNECTED, RRC-Inactive state; in response to determining that the UE has transitioned to CM-CONNECTED, RRC-Inactive state, starting a periodic update timer; determining to remove a UE-RAN context associated with the UE; and in response to determining to remove the UE-RAN context associated with the UE, sending to an AMF a N2 UE context release request including an elapsed time value of the periodic update timer.

In another embodiment the AN performs a method that includes: receiving from an AMF a user equipment (UE) context request including a NAS periodic timer and a NAS registration area, indicating that a UE is ready to transition to a CM-CONNECTED, RRC-Active state; setting up an RRC connection between the UE and the AN; determining that the UE has transitioned to CM-CONNECTED, RRC-Inactive state; in response to determining that the UE has transitioned to CM-CONNECTED, RRC-Inactive state, starting a periodic update timer; determining to remove a UE-RAN context associated with the UE; and in response to determining to remove the UE-RAN context associated with the UE, sending to the AMF a N2 UE context release request including an elapsed time value of the periodic update timer.

BRIEF DESCRIPTION OF THE DRAWINGS

The accompanying drawings, which are incorporated herein and form part of the specification, illustrate various embodiments.

DETAILED DESCRIPTION

Figure 1:
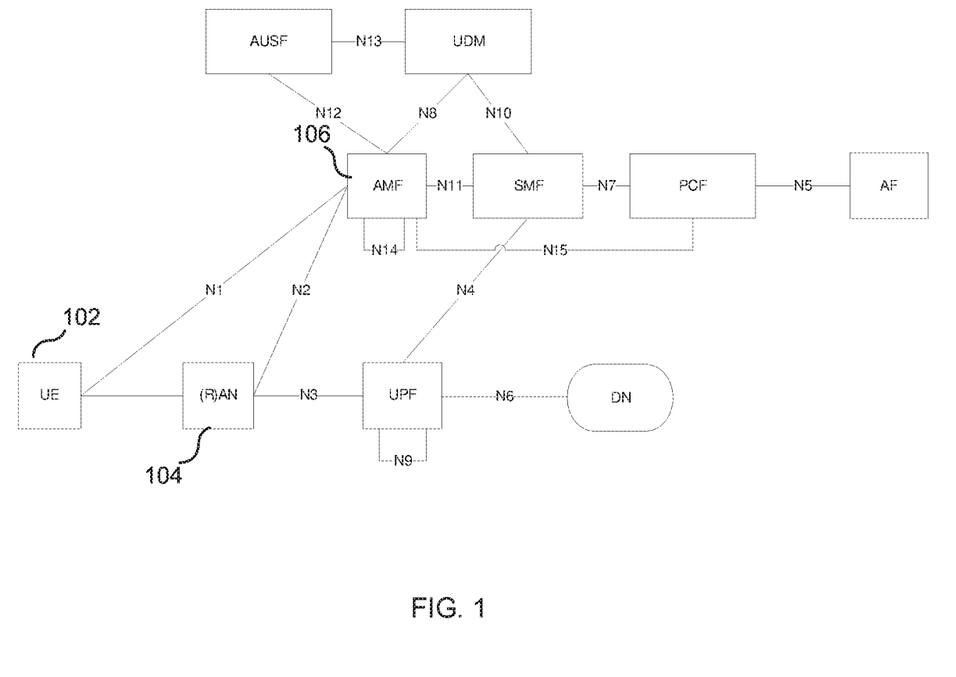
FIG. 1 illustrates a non-roaming architecture view for next generation networks, according to some embodiments.
Figure 2:
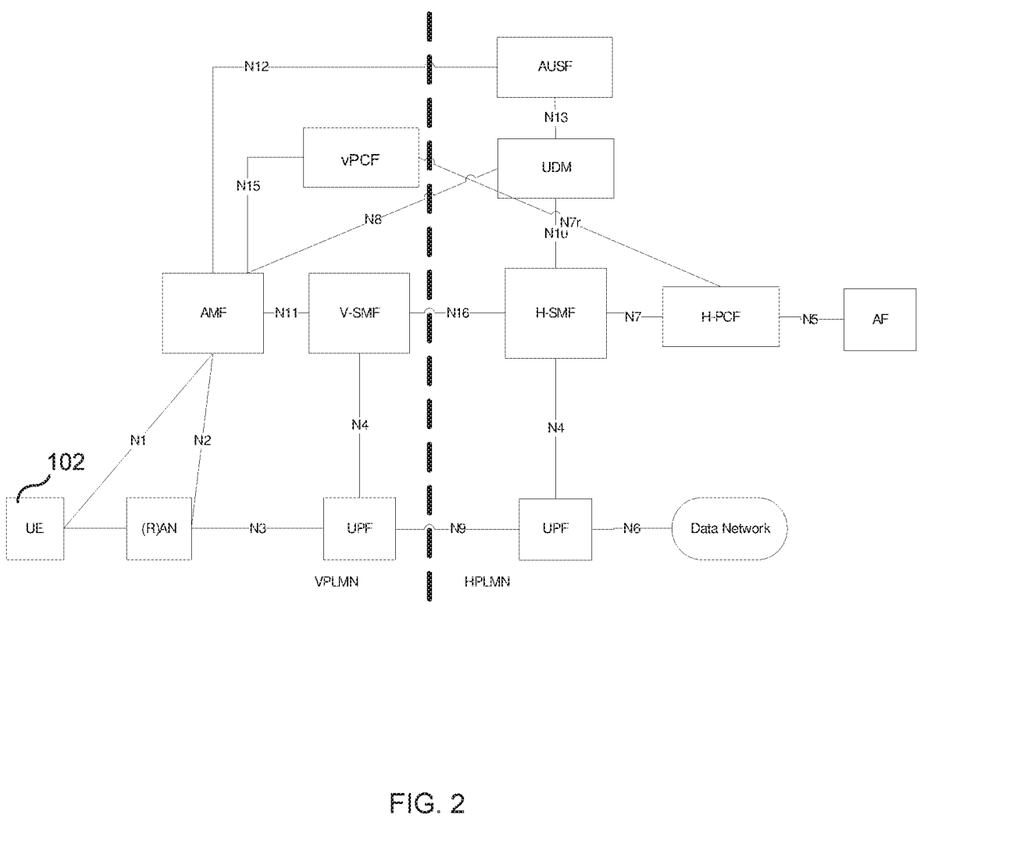
FIG. 2 illustrates a roaming (home-routed) architecture view for next generation networks, according to some embodiments.

FIG. 1 illustrates a non-roaming architecture view for next generation networks. FIG. 2 illustrates a roaming (home-routed) architecture view for next generation networks.

Referring to FIGS. 1 and 2, the Core Access and Mobility Management Function (AMF) (106) and Session Management Function (SMF) represents the control plane of the core network and has the same functionality as the control plane parts of SGSN, MME, GGSN, SGW and PGW in GERAN, UTRAN and E-UTRAN. Policy Control Function, PCF is a similar function as PCRF used for GERAN, UTRAN and E-UTRAN. Unified Data Management (UDM) is the subscription information storage including all information for the subscribers of the operator. When a subscriber connects to the network, subscription information is retrieved from UDM. In a roaming scenario, the serving operator retrieves subscription information located in the home operator's network. UDM can be seen as similar to Home Subscriber Server (HSS) or Home Location Register (HLR), the first used for LTE/EPS and the second used for GERAN and UTRAN.

Figure 3:
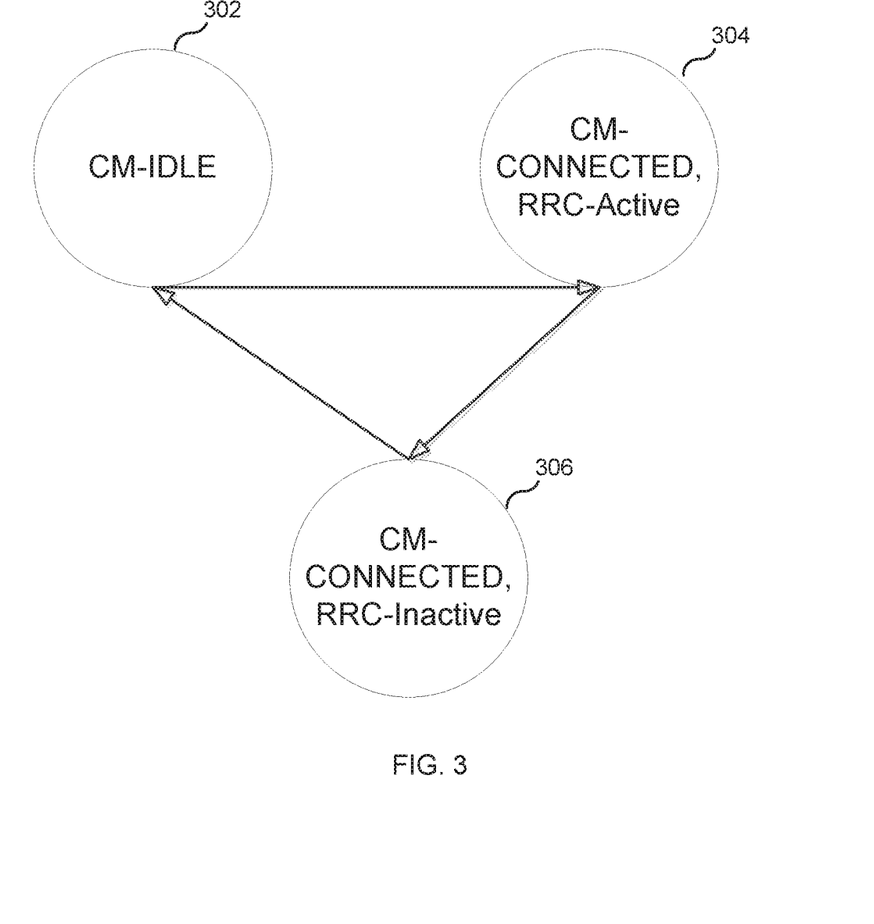
FIG. 3 is a state transition diagram illustrating UE states and their transitions.

FIG. 3 illustrates the different states that a UE can transition between. For example, UE 102 may be in one of CM-IDLE state 302; CM-CONNECTED, RRC-Active state 304; or CM-CONNECTED, RRC-Inactive state 306. In typical operation, UE 102 will transition from state 302 to state 304; from state 304 to state 306; and from state 306 to state 302.

Figure 4:
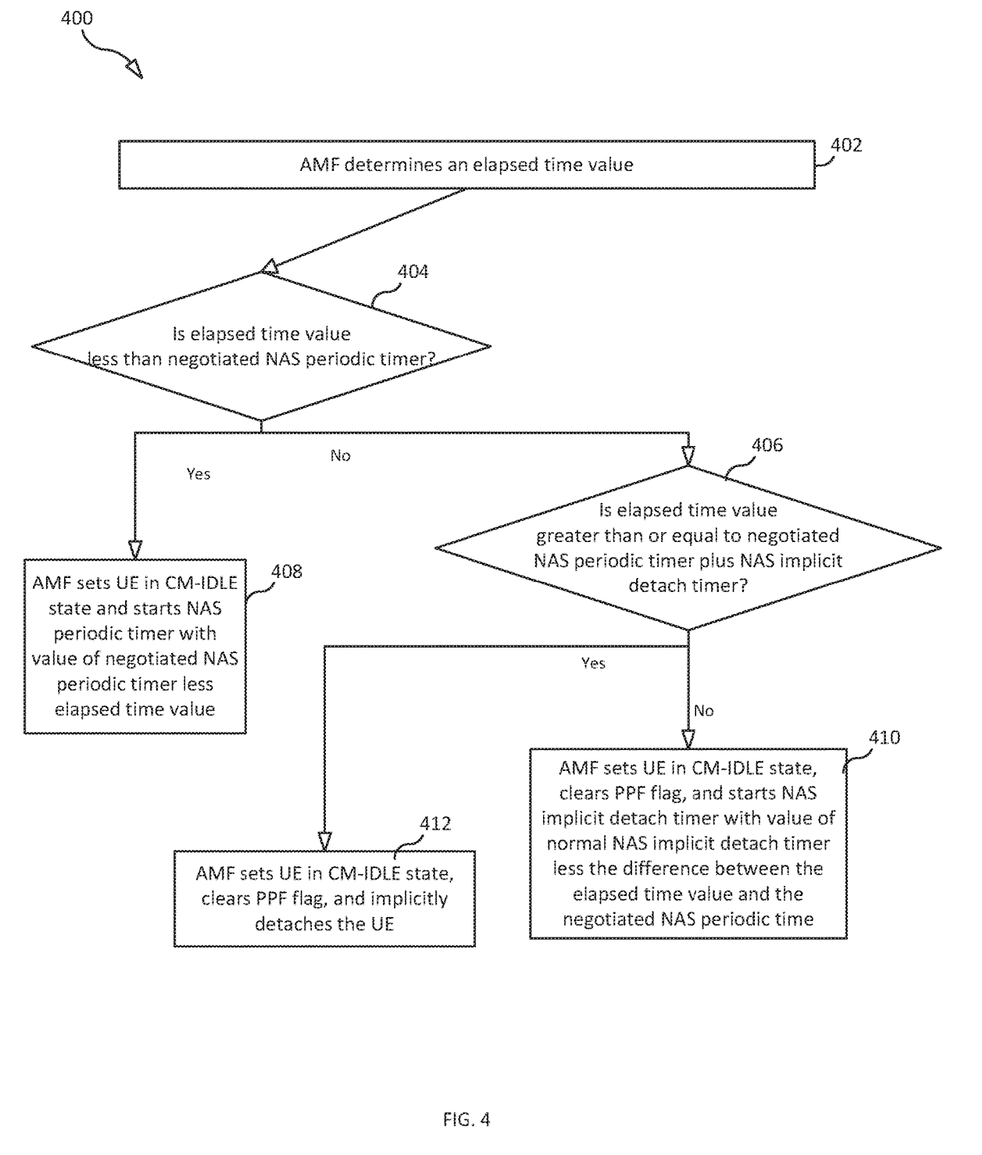
FIG. 4 is a flow chart illustrating a process according to some embodiments.

FIG. 4 illustrates a process 400 that avoids the above described problems by allowing the AMF to start a proper NAS level timer when the UE transitions to CM-IDLE state from CM-CONNECTED, RRC-Inactive state.

Process 400 may begin in step 402, in which the AMF determines an elapsed time value that represents the time spent by an access network (AN) 104 (e.g., a radio access network (RAN)) with the UE in CM-CONNECTED, RRC-Inactive state. For example, the elapsed time value may be the amount of time between a point in time when the AMF received from the AN a notification that the UE has entered the RRC inactive state and the current time or the elapsed time value may be the amount of time between a point in time when the AN starts a periodic timer to monitor UE periodic AN update and a point in time when the AN generated a N2 UE context release request for transmission to the AMF.

In some embodiments, the AMF determines the elapsed time value by receiving from the AN a UE context release request including the elapsed time value. In other embodiments, the AMF may determine the elapsed time value based on other information received from the AN (e.g., where no context release request is received, but a node level N2 Reset/Setup message is received from the AN, the AMF may use information previously received indicating that the that UE 102 had entered the RRC inactive state).

A comparison is then made, where the elapsed time value ($\delta_{RAN}$), a negotiated NAS periodic timer ($\tau_{per}$), and a normal NAS implicit detach timer ($\tau_{det}$), are made use of. In particular, the elapsed time value ($\delta_{RAN}$) can be in one of three intervals: (1) $\delta_{RAN} < \tau_{per}$; (2) $\tau_{per} \leq \delta_{RAN} < \tau_{det} + \tau_{per}$; and (3) $\delta_{RAN} \geq \tau_{det} + \tau_{per}$. Depending on which of these intervals the elapsed time value ($\delta_{RAN}$) falls into, a particular action is then taken.

For example, in step 404, it is determined if the elapsed time value is less than the negotiated NAS periodic timer. If so (i.e., $\delta_{RAN} < \tau_{per}$), then in step 408 the AMF 106 sets the UE 102 in CM-IDLE state and starts the NAS periodic timer with a value of the negotiated NAS periodic timer minus the elapsed time value (i.e., $\tau_{per} - \delta_{RAN}$). Upon this timer expiring, if the AMF 106 has not received a Tracking Area Update (TAU) request or a Routing Area Update (RAU) request, then AMF 106 clears the Paging Proceed Flag (PPF) and starts the implicit detach timer. When the implicit detach timer expires, if the UE still has not responded, the UE is implicitly detached from the network.

On the other hand, if the elapsed time value is not less than the negotiated NAS periodic timer, then, in step 406, the AMF determines whether the elapsed time value is greater than or equal to the negotiated NAS periodic timer plus the normal NAS implicit detach timer. If so (i.e., $\delta_{RAN} \geq \tau_{det} + \tau_{NAS-per}$), then in step 412, the AMF 106 sets the UE 102 in CM-IDLE state, clears the Paging Proceed (PPF) flag, and implicitly detaches the UE 102, otherwise (i.e., $\tau_{NAS-per} \leq \delta_{RAN} < \tau_{det} + \tau_{NAS-per}$) the process proceeds to step 410 in which the AMF sets the UE 102 in CM-IDLE state, clears the Paging Proceed (PPF) flag, and starts the NAS implicit detach timer with a value of the normal NAS implicit detach timer less the difference between the elapsed time value and the negotiated NAS periodic time.

Figure 5:
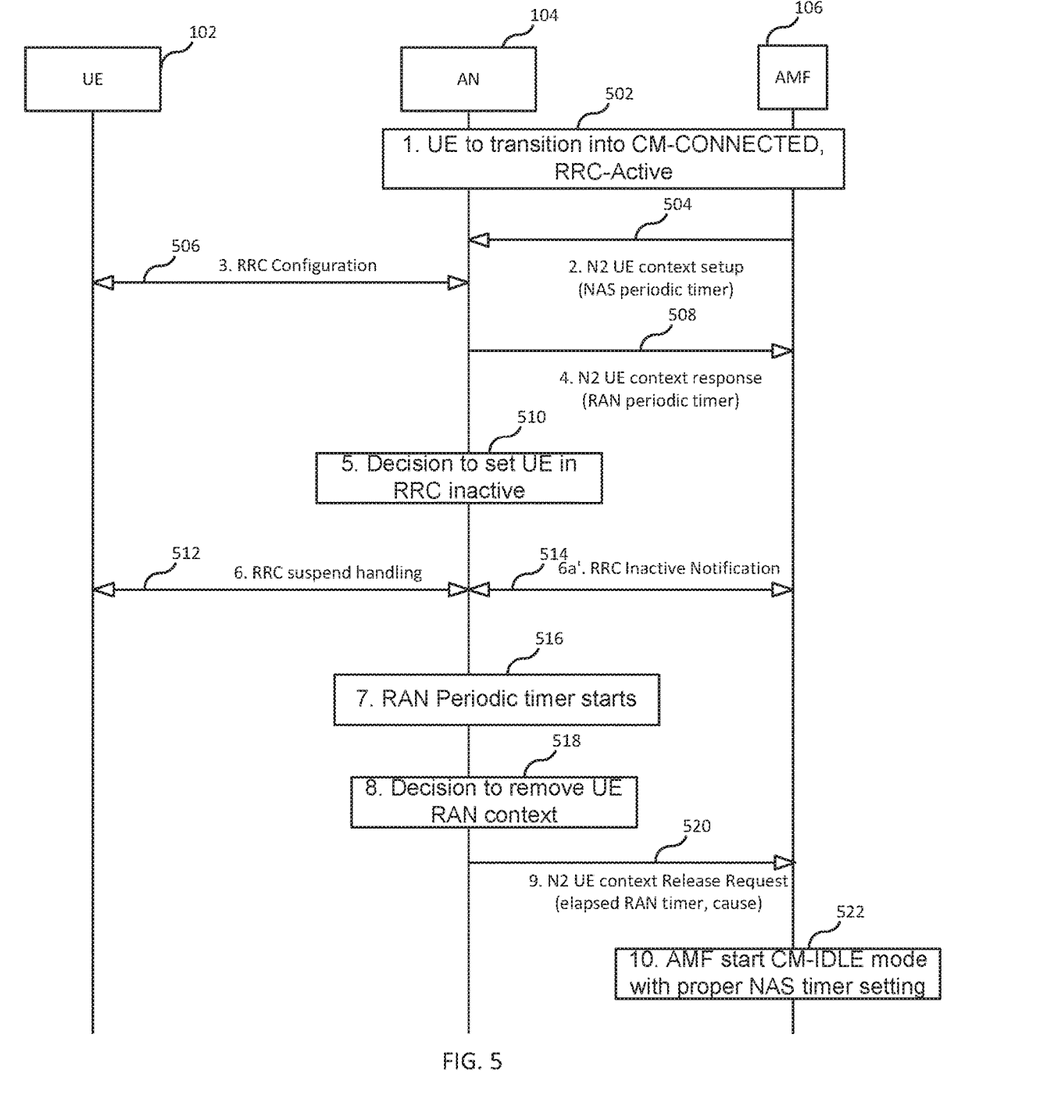
FIG. 5. is a message flow diagram illustrating an exchange of messages among a UE, an AN, and an AMF.

FIG. 5 is a message flow diagram illustrating a scenario in which the UE changes state from CM-IDLE state to CM-CONNECTED, RRC-Active state (steps 1 to 4); then to CM-CONNECTED, RRC-Inactive state (steps 5 to 8); and then to CM-IDLE state (steps 9 to step 10).

In the following description, the term NAS periodic timer is used, but in each instance it may alternatively be considered a NAS reachable timer. The AN 104 is presumed to be a RAN, but other types of access networks are possible.

The UE 102 begins in CM-IDLE state, either registered or deregistered.

Step 1. The UE 102 performs a mobility procedure (e.g., initial registration, mobility registration, service request) to change state to CM-CONNECTED, RRC-Active state (reference numeral 502). The AMF 106 determines, based for example on the mobility procedure performed by the UE 102, that the UE 102 is ready to change state to CM-CONNECTED, RRC-Active state.

Step 2. The AMF 106 sends a UE context request to RAN 104 to build up the RAN UE context (reference numeral 504). The AMF 106 will include in the UE context request 404 a NAS periodic timer, and also the NAS registration area, which can be used by the RAN 104 in steps 4 and 6.

Step 3. The RAN 104 sets up the proper RRC connection between the UE 102 and the RAN 104 (reference numeral 506).

Step 4. The RAN 104 sends a UE context response to the AMF 106 (reference numeral 508). The UE context response may include a periodic RAN update timer value. The timer value indicates the periodic RAN update timer value that the RAN 104 intends to configure the UE. The timer value can be used by the AMF 106 to calculate the elapsed time by the RAN 104 in RRC inactive state, if no specific N2 UE context release request is received (see step 9 below, reference numeral 520). The RAN 104 can at any later point in time provide/update the timer value information in the AMF 106, e.g. at uplink NAS transport, RRC inactive notification, at a handover procedure via the AMF 106.

Step 5. The RAN 104 decides to put the UE 102 in RRC-Inactive state based on its criteria (reference numeral 510). For example, such criteria may include no UE traffic/signaling after a certain amount of time, or the UE sending only infrequently small amounts of data.

Step 6. An RRC procedure between the UE 102 and the RAN 104 moves the UE 102 into RRC-Inactive state (reference numeral 512). The RAN 104 configures the UE 102 with a periodic RAN update timer value. This configuration could happen at any point in time while the UE 102 can receive this information from the RAN 104, e.g., by dedicated or broadcast signaling.

Step 6a'. As the RAN 104 configures the UE 102 with a periodic RAN update timer value, the RAN 104 also informs the AMF 106 that the UE 104 enters the RRC inactive state (reference numeral 514). The RAN 104 may additionally provide the periodic RAN update timer value to the AMF 106 in this notification (e.g., may provide/update the timer value previously sent in a UE context response). The AMF 106 may also start the timer to monitor the RRC inactive state.

Step 7. The RAN 104 starts a periodic timer to monitor the UE 102 for periodic RAN updates (reference numeral 516). The UE 102 also starts the periodic RAN Update timer.

Step 8. The RAN 104 decides to remove the UE RAN context based on various criteria (e.g., RAN periodic timer expiration, deletion of the UE Context due to memory congestion) (reference numeral 518).

Step 9. The RAN 104 sends a N2 UE context release request to the AMF 106 (reference numeral 520). The RAN 104 will provide an elapsed time value of the RAN Periodic Update timer to the AMF 106; this value indicates the time the RAN 104 has spent after starting the periodic timer (see reference numeral 516). If the RAN 104 is not able to send the N2 UE context release request, e.g. because of RAN node failure, and the RAN 104 is only able to send a node level N2 Reset/Setup message, then the AMF 106 is still able to calculate the RAN elapsed time value based on information it would have received in step 4 (reference numeral 508) or step 6a' (reference numeral 514) when the RRC inactive state notification is received from the RAN 104.

Step 10. The AMF 106 sets the UE 102 in CM-IDLE state in the following ways (reference numeral 522):

If no elapsed time value is included in the N2 UE context release request (or the AMF cannot otherwise determine the elapsed time value), and the UE 102 is not in RRC-Inactive state (prior to the UE context release request), the AMF 106 will start NAS periodic timer with the negotiated value during the registration procedure. On the other hand, if an elapsed time value is included in the N2 UE context release request (or if the AMF can determine the elapsed time value), then: (i) if the elapsed time value is smaller than the negotiated NAS periodic timer, the AMF 106 will set the UE 102 in CM-IDLE state and start the NAS periodic timer with the value negotiated during the registration procedure less the elapsed time value; (ii) if the elapsed time value is equal or greater than the negotiated NAS periodic time (but less than the negotiated NAS periodic timer plus the normal NAS Implicit detach timer), the AMF 106 will set the UE 102 in CM-IDLE state, clear the Paging Proceed Flag (PPF) parameter and start the NAS Implicit detach timer with the value of the normal NAS implicit detach timer less the difference between the elapsed time value and the negotiated NAS periodic timer; and (iii) if the elapsed time value is equal or greater than the negotiated NAS periodic timer plus the normal NAS Implicit detach timer, the AMF 106 will implicitly detach the UE.

Figure 6:
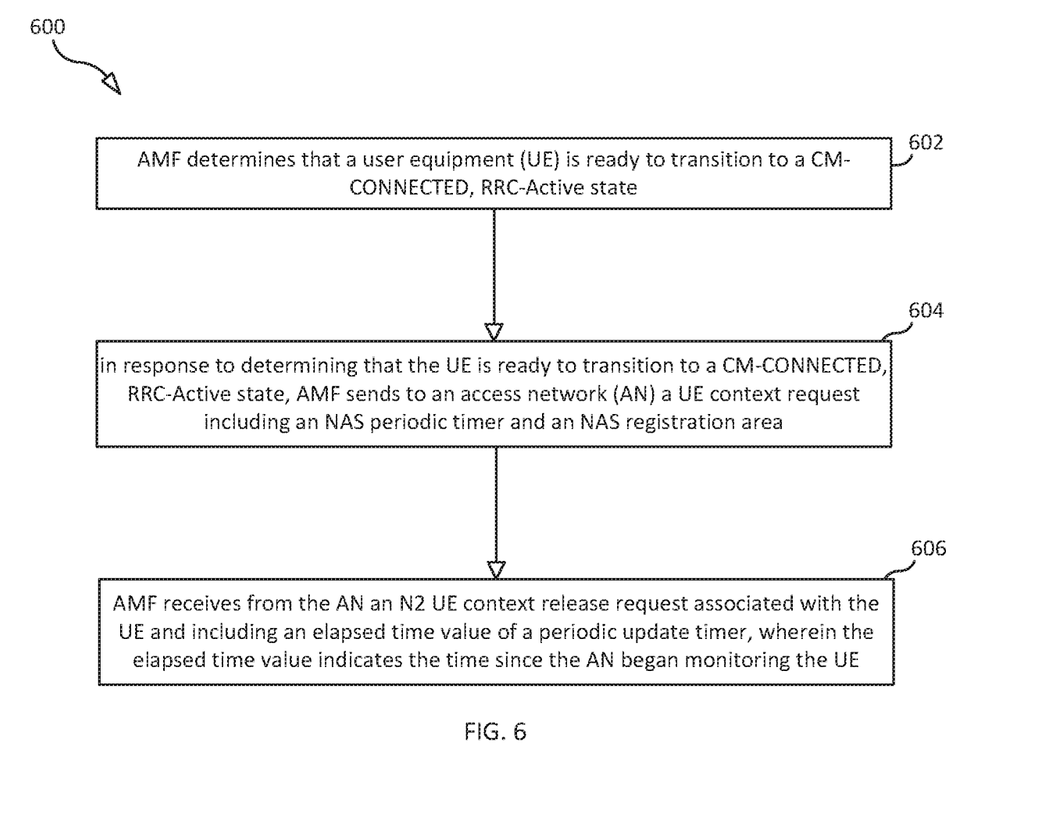
FIG. 6 is a flow chart illustrating a process according to some embodiments.

FIG. 6 illustrates a process 600 performed by an AMF. Process 600 may begin in step 602, in which the AMF determines that a user equipment (UE) is ready to transition to a CM-CONNECTED, RRC-Active state.

In step 604, in response to determining that the UE is ready to transition to a CM-CONNECTED, RRC-Active state, the AMF sends to an access network (AN) a UE context request including a NAS periodic timer and a NAS registration area.

In step 606, the AMF receives from the AN a N2 UE context release request associated with the UE and including an elapsed time value that indicates the amount of time that elapsed between the AN starting a periodic timer for use in monitoring the UE and the AN transmitting the N2 UE context release request.

Figure 7:
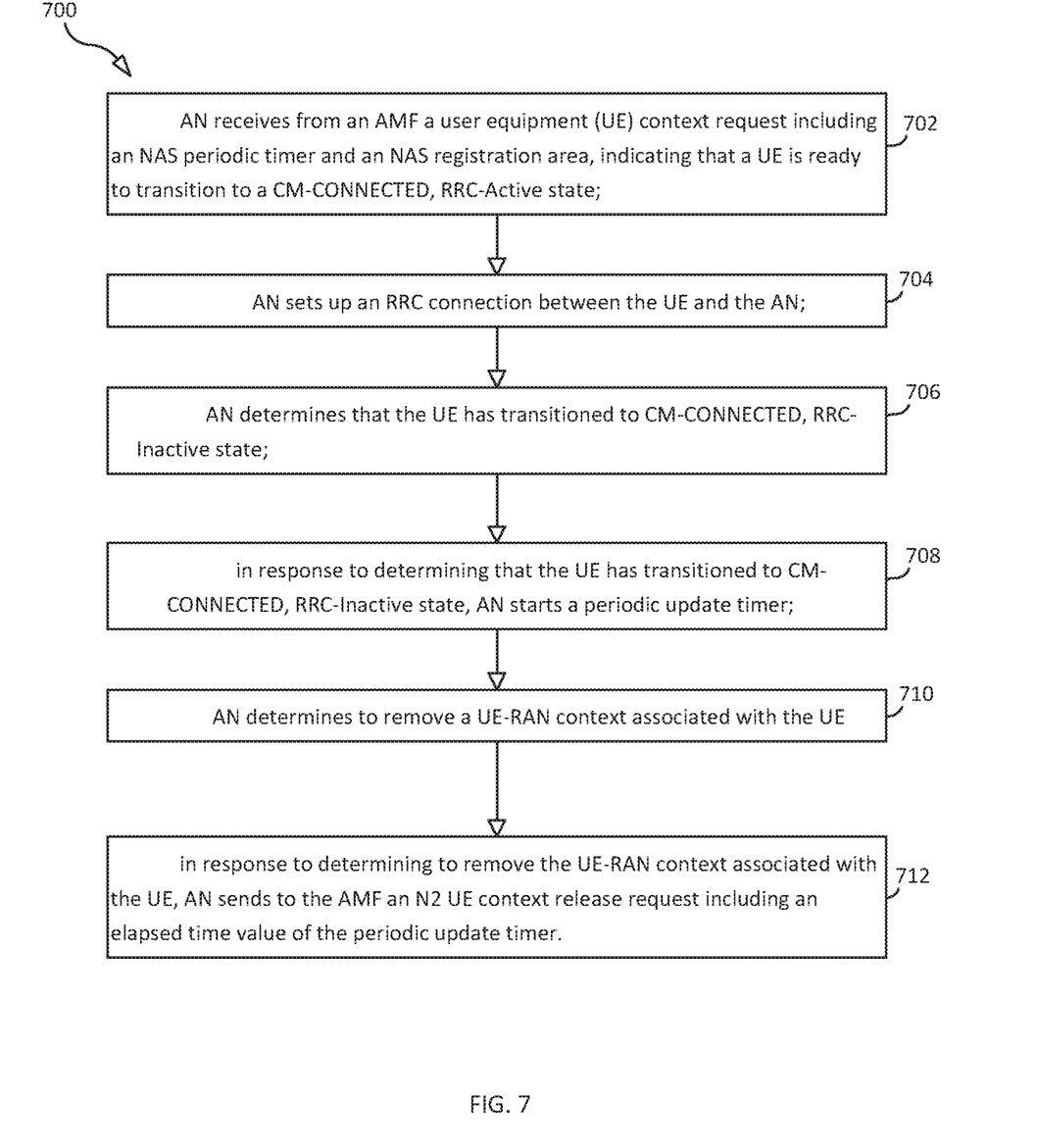
FIG. 7 is a flow chart illustrating a process according to some embodiments.

FIG. 7 illustrates a process 700 performed by an AN. Process 700 may begin in step 702, in which the AN receives from an AMF a user equipment (UE) context request including a NAS periodic timer and a NAS registration area, indicating that a UE is ready to transition to a CM-CONNECTED, RRC-Active state.

In step 704, AN sets up an RRC connection between the UE and the AN.

In step 706, the AN determines that the UE has transitioned to CM-CONNECTED, RRC-Inactive state.

In step 708, in response to determining that the UE has transitioned to CM-CONNECTED, RRC-Inactive state, the AN starts a periodic update timer.

In step 710, the AN determines to remove a UE-RAN context associated with the UE.

In step 712, in response to determining to remove the UE-RAN context associated with the UE, the AN sends to the AMF a N2 UE context release request including an elapsed time value of the periodic update timer.

Figure 8:
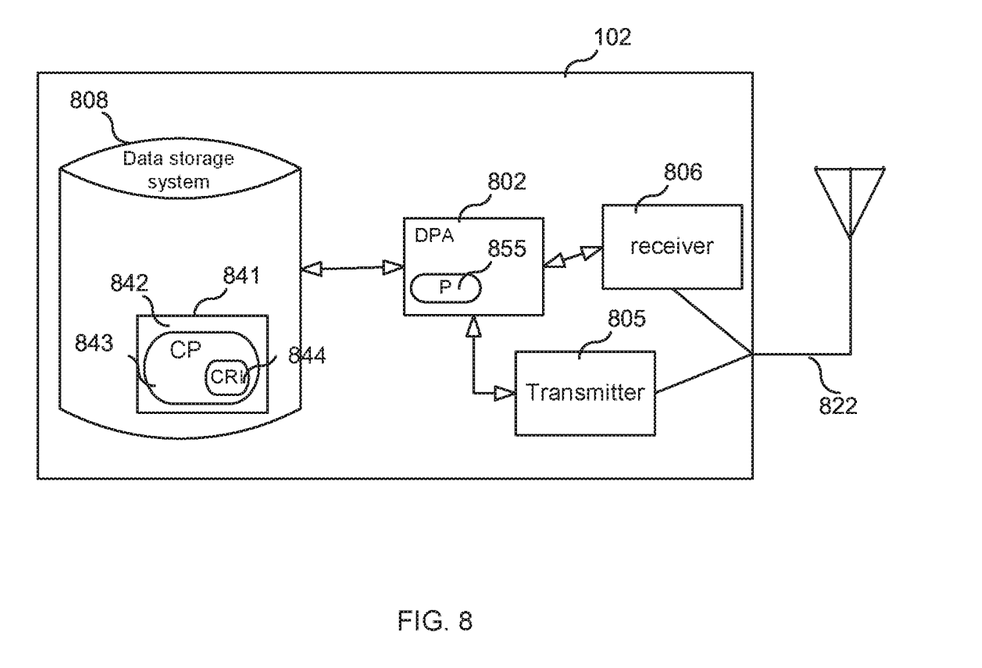
FIG. 8 is a block diagram of a UE according to some embodiments.

FIG. 8 is a block diagram of UE 102 according to some embodiments. As shown in FIG. 8, UE 102 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a transmitter 805 and a receiver 804 coupled to an antenna 822 for enabling UE 102 to transmit data to and receive data from an AN node (e.g., base station); and local storage unit (a.k.a., "data storage system") 808, which may include one or more non-volatile storage devices and/or one or more volatile storage devices (e.g., random access memory (RAM)). In embodiments where UE 102 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited to, magnetic media (e.g., a hard disk), optical media, memory devices (e.g., random access memory), and the like. In some embodiments, the CRI 844 of computer program 843 is configured such that when executed by data processing apparatus 802, the CRI causes UE 102 to perform steps described above (e.g., steps described above with reference to the flow charts). In other embodiments, UE 102 may be configured to perform steps described herein without the need for code. That is, for example, data processing apparatus 802 may consist merely of one or more ASICs. Hence, the features of the embodiments described herein may be implemented in hardware and/or software.

Figure 9:
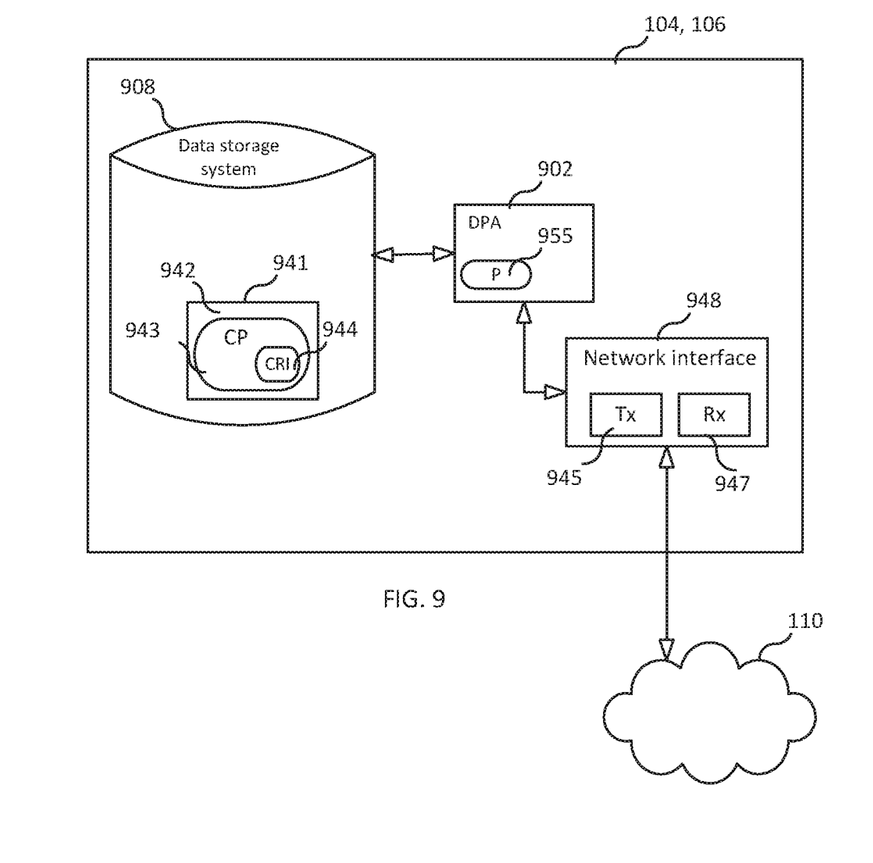
FIG. 9 is a block diagram of an AMF or AN according to some embodiments.

FIG. 9 is a block diagram of AN 104 and AMF 106 according to some embodiments. As shown in FIG. 9, AN 104 and AMF 106 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling AMF 106 to transmit data to and receive data from other nodes connected to a network 110 (e.g., an Internet Protocol (IP) network) to which network interface 948 is connected; and local storage unit (a.k.a., "data storage system") 908, which may include one or more non-volatile storage devices and/or one or more volatile storage devices (e.g., random access memory (RAM)). In embodiments where AMF 106 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited to, magnetic media (e.g., a hard disk), optical media, memory devices (e.g., random access memory), and the like. In some embodiments, the CRI 944 of computer program 943 is configured such that when executed by data processing apparatus 902, the CRI causes AN 104 or AMF 106 to perform steps described above (e.g., steps described above with reference to the flow charts). In other embodiments, AN 104 or AMF 106 may be configured to perform steps described herein without the need for code. That is, for example, data processing apparatus 902 may consist merely of one or more ASICs. Hence, the features of the embodiments described herein may be implemented in hardware and/or software.

Figure 10:
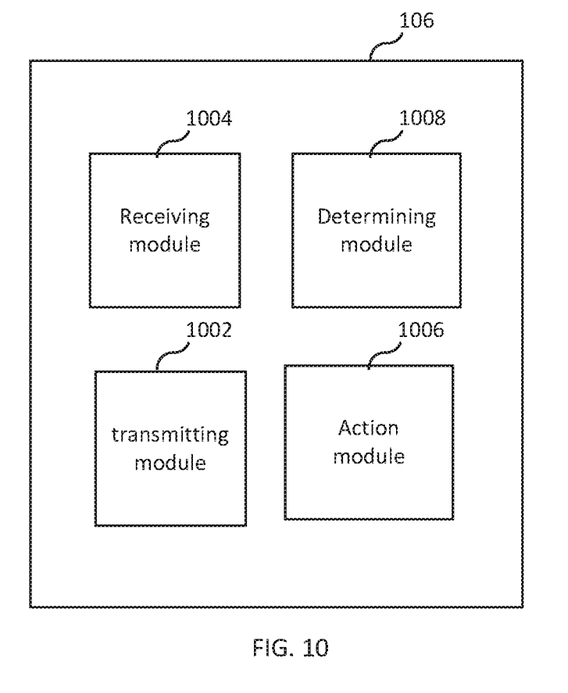
FIG. 10 is a diagram showing functional modules of a AMF according to some embodiments.

FIG. 10 is a diagram showing functional modules of AMF 106 according to some embodiments. As shown in FIG. 10, AMF 106 includes a receiving module 1004, a transmitting module 1002, an action module 1006 and a determining module 1008. The determining module is configured to determine an elapsed time value ($\delta_{RAN}$); and to determine whether the elapsed time value is less than a negotiated NAS periodic timer ($\tau_{NAS\text{-}per}$). The action module is configured to, as a result of the determining module determining that $\delta_{RAN} < \tau_{NAS\text{-}per}$, transition the UE to CM-IDLE state and start a NAS periodic timer with a value equal to $\tau_{NAS\text{-}per} - \delta_{RAN}$. The action module is further configured to, as a result of the determining module determining that $\tau_{NAS\text{-}per} \leq \delta_{RAN}$, transition the UE to CM-IDLE state and clear a Paging Proceed Flag (PPF) associated with the UE. The action module is further configured to, as a result of the determining module determining that $\tau_{NAS\text{-}per} \leq \delta_{RAN}$ and $\delta_{RAN} < \tau_{NAS\text{-}per} + \tau_{det}$, start a NAS periodic timer at a value equal to $\tau_{det} - (\delta_{RAN} - \tau_{NAS\text{-}per})$, wherein $\tau_{det}$ is a NAS implicit detach timer. The action module is further configured to, as a result of the determining module determining that $\delta_{RAN} > \tau_{NAS\text{-}per} + \tau_{det}$, implicitly detach the UE.

The determining module is further configured to determine that a user equipment (UE) is ready to transition to a CM-CONNECTED, RRC-Active state. The transmitting module is configured to, in response to the determining module determining that the UE is ready to transition to a CM-CONNECTED, RRC-Active state, send to an access network (AN) a UE context request including a NAS periodic timer and a NAS registration area. The receiving module is configured to receive a N2 UE context release request transmitted by the AN, wherein the N2 UE context release request is associated with a UE and includes an elapsed time value indicating the amount of time that elapsed between the AN starting a periodic timer for use in monitoring the UE and the AN transmitting the N2 UE context release request.

Figure 11:
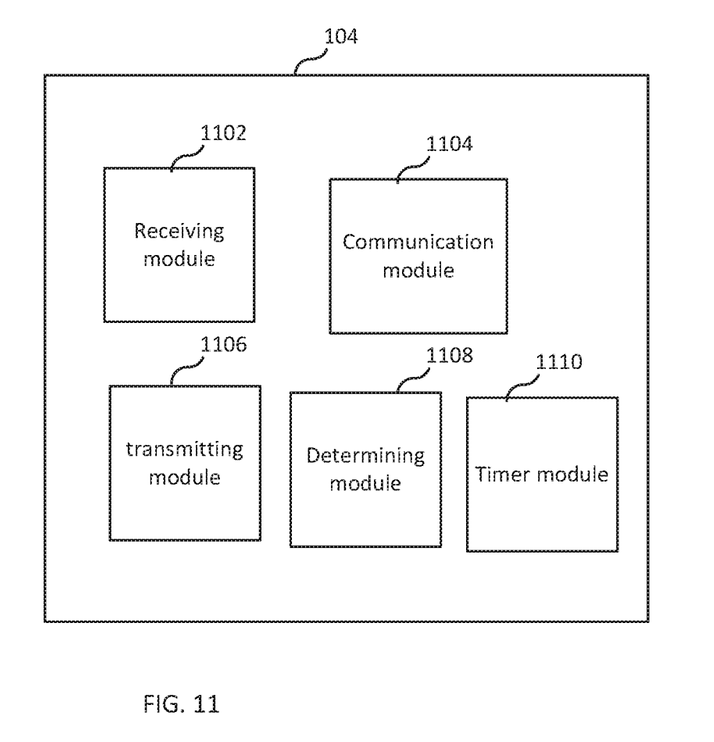
FIG. 11 is a diagram showing functional modules of an AN according to some embodiments.

FIG. 11 is a diagram showing functional modules of AN 104 according to some embodiments. As shown in FIG. 11, AN 104 includes a receiving module 1102, a communication module 1104, a transmitting module 1106, a determining module 1108, and a timer module 1110. The receiving module is configured to receive from an AMF a user equipment (UE) context request including a NAS periodic timer and a NAS registration area, indicating that a UE is ready to transition to a CM-CONNECTED, RRC-Active state. The communication module is configured to setup an RRC connection between the UE and the AN. The determining module is configured to determine that the UE has transitioned to CM-CONNECTED, RRC-Inactive state. The timer module is configured to, in response to the determining module determining that the UE has transitioned to CM-CONNECTED, RRC-Inactive state, start a periodic update timer. The determining module is further configured to determine to remove a UE-RAN context associated with the UE. The transmitting module is configured to, in response to the determining module determining to remove the UE-RAN context associated with the UE, send to the AMF a N2 UE context release request including an elapsed time value of the periodic update timer. The transmitting module is further configured to send to the AMF a UE context response comprising a periodic RAN update timer value indicating the period RAN update timer value that the RAN intends to configure the UE with. The transmitting module is further configured to notify the AMF that the UE has entered into the RRC inactive state.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The International Patent Application (i.e., PCT/EP2017/084302) and the provisional application mentioned above included an appendix that contained a proposal for modifying 3GPP TS 23.501. The relevant portion of this proposal (a.k.a., "contribution") is reproduced below:

Abstract of the Contribution:

The solution proposes a coordination between 5G RAN and 5G Core to coordinate the time value spent by RAN in RRC inactive state, so 5G Core can start a proper NAS level timer when UE enters CM-IDLE mode when UE change state from "CM-CONNECTED" and "RRC inactive" to "CM-IDLE".

Proposal

The following changes to the TS 23.501 are proposed.

5.3.4 UE Mobility 5.3.4.1 Mobility Restrictions 5.3.4.1.1 General

Mobility Restrictions restrict mobility handling or service access of a UE in the 5G System. The Mobility Restriction functionality is provided by the UE, the radio access network and the core network.

Mobility Restrictions only apply to 3GPP access, they do not apply to non-3GPP access.

Mobility Restrictions in CM-IDLE state and CM-CONNECTED state when in RRC Inactive state are executed by the UE based on information received from the core network. Mobility Restrictions in CM-CONNECTED and RRC-Connected state are executed by the radio access network and the core network. In CM-CONNECTED state, the core network provides Mobility Restrictions to the radio access network with a Handover Restriction List.

Mobility restrictions consists of (A) RAT restriction, (B) forbidden area, and (C) service area restrictions as follows:

(A) RAT restriction: Defines the 3GPP Radio Access Technology(ies), a UE is not allowed to access. In a restricted RAT a UE is based on subscription not permitted to initiate any communication with the network;

(B) Forbidden area: In a Forbidden area under a given RAT, the UE is based on subscription not permitted to initiate any communication with the network; and (C) Service area restrictions: Defines areas in which the UE may or may not initiate communication with the network as follows:

(C1) Allowed area: In an allowed area under a given RAT, the UE is permitted to initiate communication with the network as allowed by the subscription; and (C2) Non-allowed area: In a non-allowed area under a given RAT a UE is service area restricted based on subscription. The UE is not allowed to initiate UE triggered Service Request or SM signalling to obtain UE initiated user services (both in CM-IDLE and in CM-CONNECTED states). The UE shall perform periodic and mobility registration updates, and if the UE is not already registered, it may also perform initial registration to attach to network in Non-allowed area due to mobility. The UE in a Non-allowed area shall respond to core network paging with Service Request.

For a given UE, the core network determines the service area restrictions based on UE subscription information. Optionally the allowed area may in addition be fine-tuned by the PCF e.g. based on UE location, and network policies.

Service area restrictions can be changed due to, e.g. subscription, location, and/or policy change. Service area restrictions may be updated during a Registration procedure.

If the UE has overlapping areas between RAT restrictions, forbidden areas, allowed areas and non-allowed areas, or any combination of them, the UE shall proceed in the following precedence order: (1) The evaluation of RAT restrictions shall take precedence over the evaluation of any other Mobility restrictions; (2) The evaluation of forbidden areas shall take precedence over the evaluation of allowed areas and non-allowed areas; and (3) The evaluation of non-allowed area shall take precedence over the evaluation of allowed areas.

A UE shall override any forbidden area and non-allowed area restrictions whenever access to the network is required for regulatory prioritized services like Emergency services and MPS.

5.3.3.2.3 CM-CONNECTED State

A UE in CM-CONNECTED state has a NAS signalling connection with the AMF over N1.

In the CM-CONNECTED state, the UE shall: enter CM-IDLE state whenever the AN signaling connection is released (e.g. entering RRC Idle state over 3GPP access), see TS 38.nnn.

In the CM-CONNECTED state, the AMF shall: enter CM-IDLE state whenever the N2 signaling connection for this UE is released.

Upon completion of a NAS signalling procedure, the AMF may decide to release the NAS signalling connection with the UE, after which the state at both the UE and the AMF is changed to CM-IDLE.

The AMF may keep a UE in CM-CONNECTED state until the UE de-registers from the core network.

A UE in CM-CONNECTED state can be in RRC Inactive state, see TS 38.xxx. The RRC Inactive state has following properties: (a) UE performs registration update procedure to AMF when the UE moves outside of its registration Area(s); (b) The AS context is stored in RAN and the UE; (c) The AS Context may need to be transferred between the RAN nodes; (d) U-plane and C-plane connections between RAN and CN for the UE are kept established; (e) UE reachability is managed by the RAN, with assistance from core network; and (f) UE paging is managed by the RAN.

While a UE is in CM-CONNECTED, RAN shall notify the AMF about UE state transitions between RRC Connected and RRC Inactive.

5.4.1.3 Mobile Initiated Connection Only (MICO) Mode

A UE may indicate preference for MICO mode during initial registration or registration update. The AMF, based on local configuration, UE indicated preferences, UE subscription information and network policies, or any combination of them, determines whether MICO mode is allowed for the UE and indicates it to the UE during Registration procedure. AMF indicates to RAN if the UE is in MICO mode.

The UE and core network re-initiates or exits the MICO mode at subsequent registration signalling. If MICO mode is not indicated explicitly in Registration, then both the UE and the AMF shall not use the MICO mode.

The AMF assigns a registration area to the UE during the registration procedure. When the AMF indicates MICO mode to a UE, the registration area is not constrained by paging area size. The network, based on local policy, and subscription information, may decide to provide an "all PLMN" registration area indication to the UE. In that case, re-registration to the same PLMN due to mobility does not apply.

When the AMF indicates MICO mode to a UE, the AMF considers the UE always unreachable while in CM-IDLE. The CN rejects any request for downlink data delivery for an MICO UE in idle mode. The CN also defers downlink transport over NAS for SMS, location services, etc. The UE in MICO mode is only reachable for mobile terminated data or signalling when the UE is in CM-CONNECTED mode for the PDU sessions that are resumed.

A UE in MICO mode performs periodic registration at the expiration of periodic registration timer.

A UE in MICO mode need not listen to paging while in CM-IDLE. A UE in MICO mode may stop any access stratum procedures in CM-IDLE, until the UE initiates CM-IDLE to CM-CONNECTED mode procedures due to one of the following triggers: a change in the UE (e.g. change in configuration) requires an update its registration with the network; periodic registration timer expires; MO data pending; and MO signalling pending (e.g. SM procedure initiated).

If a registration area that is not the "all PLMN" registration area is allocated to a UE in MICO mode, then the UE determines if it is within the registration area or not when it has MO data or MO signalling.

5.4.2 UE Reachability in CM-CONNECTED

For a UE in CM-CONNECTED state: the AMF knows the UE location on a serving (R)AN node granularity; when the UE reachability can be managed by the 5G RAN, see TS 38.xxx, the AMF shall provide the periodic Tracking Area Update timer value and the Registration Area to the 5G RAN; and the 5G RAN notifies the AMF when UE becomes unreachable from RAN point of view.

UE RAN reachability management is used by RAN for UEs in RRC Inactive state. The location of a UE in RRC Inactive state is known by the RAN on a RAN Paging Area granularity. A UE in RRC Inactive state is paged in cells of the RAN Paging Area it is currently registered in. The RAN Paging Area can be a subset of cells configured in UE's Registration Area or all cells configured in the UE's Registration Area. UE in RRC Inactive state performs Paging Area Update when entering a RAN Paging Area that the UE is not registered in.

At transition into RRC Inactive state RAN configures the UE with a periodic PAU timer value and the timer is restarted in the UE and in the RAN. After the expiry of the periodic PAU timer in the UE, the UE in RRC Inactive state performs periodic PAU.

If the periodic PAU timer expires in RAN, the RAN shall notify the AMF that the UE is unreachable due to expiry of the periodic PAU time. On the reception of the UE unreachability notification from the RAN, the AMF shall enter CM-IDLE state.

If the UE in RRC Inactive state is out of 5G-RAN coverage when its periodic PAU time expires, the UE shall enter RRC Idle and CM-IDLE state and perform Registration Area update procedure when it returns next time to 5G-RAN.

The invention claimed is:

1. A method performed by an access and mobility management function (AMF), the method comprising:
   determining an elapsed time value ($\delta_{RAN}$); and
   determining whether the elapsed time value ($\delta_{RAN}$) is less than a negotiated Non-Access-Stratum (NAS) periodic timer ($\tau_{NAS\text{-}per}$), wherein
   the AMF is configured such that, as a result of the AMF determining that $\delta_{RAN} < \tau_{NAS\text{-}per}$, the AMF transitions a user equipment (UE) to CM-IDLE state and starts a NAS periodic timer with a value equal to $\tau_{NAS\text{-}per} - \delta_{RAN}$.

2. The method of claim 1, wherein the AMF is further configured such that as a result of the AMF determining that $\tau_{NAS\text{-}per} \le \delta_{RAN}$, the AMF transitions the UE to CM-IDLE state and clears a Paging Proceed Flag (PPF) associated with the UE.

3. The method of claim 2, wherein the AMF is further configured such that as a result of the AMF determining that $\tau_{NAS\text{-}per} \le \delta_{RAN}$ and $\delta_{RAN} < \tau_{NAS\text{-}per} + \tau_{det}$, the AMF starts a NAS periodic timer at a value equal to $\tau_{det} - (\delta_{RAN} - \tau_{NAS\text{-}per})$, wherein $\tau_{det}$ is a NAS implicit detach timer.

4. The method of claim 2, wherein the AMF is further configured such that as a result of the AMF determining that $\delta_{RAN} > \tau_{NAS\text{-}per} + \tau_{det}$, the AMF implicitly detaches the UE.

5. The method of claim 1, where determining the elapsed time value ($\delta_{RAN}$) comprises receiving from an access network (AN) a user equipment (UE) context release request including an elapsed time value ($\delta_{RAN}$).

6. An access and mobility management function (AMF) configured to perform the method of claim 1, wherein the AMF comprises:
   a receiver;
   a transmitter;
   a data storage system; and
   a data processing apparatus comprising a processor, wherein the data processing apparatus is coupled to the data storage system, the transmitter, and the receiver.

7. The AMF of claim 6, wherein the data processing apparatus is further configured to, as a result of determining that $\tau_{NAS\text{-}per} \le \delta_{RAN}$, transition the UE to CM-IDLE state and clear a Paging Proceed Flag (PPF) associated with the UE.

8. The AMF of claim 6, wherein the data processing apparatus is further configured to, as a result of determining that $\tau_{NAS\text{-}per} \le \delta_{RAN}$ and $\delta_{RAN} < \tau_{NAS\text{-}per} + \tau_{det}$, start a NAS periodic timer at a value equal to $\tau_{det} - (\delta_{RAN} - \tau_{NAS\text{-}per})$, wherein $\tau_{det}$ is a NAS implicit detach timer.

9. The AMF of claim 6, wherein the data processing apparatus is further configured to, as a result of determining that $\delta_{RAN} > \tau_{NAS\text{-}per} + \tau_{det}$, implicitly detach the UE (102).

* * * * *

UNITED STATES PATENT AND TRADEMARK OFFICE
CERTIFICATE OF CORRECTION

PATENT NO.        : 10,616,850 B2
APPLICATION NO.   : 16/030540
DATED             : April 7, 2020
INVENTOR(S)       : Chen et al.

Page 1 of 1

It is certified that error appears in the above-identified patent and that said Letters Patent is hereby corrected as shown below:

In the Specification

In Column 3, Line 15, delete "5." and insert -- 5 --, therefor.

In Column 5, Line 39, delete "UE 104" and insert -- UE 102 --, therefor.

In the Claims

In Column 12, Line 52, in Claim 9, delete "UE (102)." and insert -- UE. --, therefor.

Signed and Sealed this
First Day of September, 2020

Andrei Iancu
*Director of the United States Patent and Trademark Office*